United States Patent
Sauers et al.

(10) Patent No.: US 9,863,822 B2
(45) Date of Patent: Jan. 9, 2018

(54) DEFORMATION COMPENSATING COMPLIANT MATERIAL

(71) Applicant: Apple Inc., Cupertino, CA (US)

(72) Inventors: Jason C. Sauers, Cupertino, CA (US); Po-Jui Chen, Cupertino, CA (US); Tyler S. Bushnell, Cupertino, CA (US)

(73) Assignee: Apple Inc., Cupertno, CA (US)

(*) Notice: Subject to any disclaimer, the term of this patent is extended or adjusted under 35 U.S.C. 154(b) by 4 days.

(21) Appl. No.: 14/721,111

(22) Filed: May 26, 2015

(65) Prior Publication Data

US 2016/0195441 A1 Jul. 7, 2016

Related U.S. Application Data

(60) Provisional application No. 62/100,664, filed on Jan. 7, 2015.

(51) Int. Cl.
| | |
|---|---|
| *G01L 1/00* | (2006.01) |
| *G01L 1/14* | (2006.01) |
| *G01L 1/26* | (2006.01) |
| *G06F 3/044* | (2006.01) |
| *G06F 3/041* | (2006.01) |

(52) U.S. Cl.
CPC ............... *G01L 1/142* (2013.01); *G01L 1/26* (2013.01); *G06F 3/044* (2013.01); *G06F 3/0414* (2013.01)

(58) Field of Classification Search
CPC ... G01L 1/26; G01L 1/142; G01L 1/18; G06F 3/0488; G06F 3/0414; G06F 3/044; G06F 3/045; B32B 2457/208

USPC ...... 73/862.621, 862.622, 862.625, 862.626, 73/862.627, 862.632, 862.633, 862.636, 73/862.638; 178/18.05, 18.06; 345/173
See application file for complete search history.

(56) References Cited

U.S. PATENT DOCUMENTS

| | | |
|---|---|---|
| 4,342,460 A | 8/1982 | Eng |
| 5,915,285 A | 6/1999 | Sommer |
| 6,002,389 A * | 12/1999 | Kasser ............... G06F 3/041 178/18.01 |
| 6,748,810 B2 | 6/2004 | Christensen et al. |
| 7,017,420 B2 | 3/2006 | Kalvesten et al. |
| 7,536,919 B2 | 5/2009 | Powlesland et al. |
| 7,735,372 B2 | 6/2010 | Walter |
| 8,479,585 B2 | 7/2013 | Shaw-Klein |

(Continued)

OTHER PUBLICATIONS

Bau, et al., "TeslaTouch: Electrovibration for Touch Surfaces," UIST'10, Oct. 3-6, 2010, New York, New York USA, 10 pages.

(Continued)

*Primary Examiner* — Benjamin Schmitt
(74) *Attorney, Agent, or Firm* — Brownstein Hyatt Farber Schreck, LLP

(57) ABSTRACT

A force sensor includes compliant material that is configured to stay within a maximum uncompressed dimension in a first direction when compressed in a second direction. The first direction may be perpendicular to the second direction. The compliant material may stay within the maximum uncompressed dimension when compressed by expanding into one or more gaps defined in the compliant material. Such gaps may be defined on an external surface of the compliant material and/or internal to the compliant material. The gaps may be formed using a variety of different processes during or after formation of the compliant material.

20 Claims, 7 Drawing Sheets

(56) References Cited

U.S. PATENT DOCUMENTS

| | | | |
|---|---|---|---|
| 8,492,238 B2 | 7/2013 | Celik-Butler et al. | |
| 8,686,714 B2 | 4/2014 | Goossens | |
| 8,780,074 B2 | 7/2014 | Castillo et al. | |
| 8,886,334 B2 | 11/2014 | Ghaffari et al. | |
| 9,035,903 B2 | 5/2015 | Binstead | |
| 9,116,569 B2 | 8/2015 | Stacy et al. | |
| 9,136,459 B2 | 9/2015 | Fujii et al. | |
| 9,246,486 B2 | 1/2016 | Yang et al. | |
| 9,276,191 B2 | 3/2016 | Ando et al. | |
| 9,281,415 B2* | 3/2016 | Bao | H01L 29/84 |
| 2003/0160768 A1* | 8/2003 | Tanabe | G06F 3/045 345/173 |
| 2007/0229464 A1* | 10/2007 | Hotelling | G06F 3/0414 345/173 |
| 2010/0024573 A1* | 2/2010 | Daverman | G01L 1/142 73/862.626 |
| 2010/0123686 A1 | 5/2010 | Klinghult et al. | |
| 2011/0167972 A1* | 7/2011 | Gilliver | B26D 3/006 83/19 |
| 2012/0062245 A1* | 3/2012 | Bao | H01L 29/84 324/661 |
| 2013/0042702 A1 | 2/2013 | Huang et al. | |
| 2013/0082970 A1 | 4/2013 | Frey et al. | |
| 2014/0338459 A1 | 11/2014 | Besling et al. | |
| 2014/0368455 A1 | 12/2014 | Croisonnier et al. | |
| 2016/0062517 A1 | 3/2016 | Meyer et al. | |
| 2016/0306481 A1 | 10/2016 | Filiz et al. | |
| 2016/0377501 A1 | 12/2016 | Agarwal et al. | |
| 2017/0010723 A1 | 1/2017 | Smith et al. | |

OTHER PUBLICATIONS

Feist, "Samsung snags patent for new pressure sensitive touchscreens," posted on AndroidAuthority.com at URL: http://www.androidauthority.com/samsung-patent-pressure-sensitive-touch-screens-354860, Mar. 7, 2014, 1 page.

* cited by examiner

DEFORMATION COMPENSATING COMPLIANT MATERIAL

TECHNICAL FIELD

This application claims the benefit under 35 U.S.C. §119 (e) of U.S. Provisional Patent Application No. 62/100,664, filed on Jan. 7, 2015, and entitled "Deformation Compensating Compliant Material," which is incorporated by reference as if fully disclosed herein.

TECHNICAL FIELD

This disclosure relates generally to compliant materials, and more specifically to compliant materials that are designed to compensate for deformation.

BACKGROUND

Compliant materials such as silicone and/or various elastomers may compress when force is applied. Though portions of such compliant materials may compress when force is applied to a surface, the compression of those portions may cause a corresponding expansion of another portion of the compliant material. For example, if force is applied to a top surface of a compliant material to compress the compliant material in a vertical direction, the compression may cause the compliant material to correspondingly expand in a horizontal direction.

In many uses of such compliant materials, the expansion of the compliant material corresponding to a compression under force may be intentional. For example, a gasket and/or other kind of seal may be designed such that compression of one portion causes another portion to expand in order to form a seal for components of an apparatus or system.

SUMMARY

The present disclosure details systems, apparatuses methods related to compliant materials that are designed to compensate for deformation. A force sensor may include compliant material that may be configured to stay within a maximum uncompressed dimension in a first direction when compressed in a second direction perpendicular to the first direction. In this way, the compliant material may be compressed without expanding beyond the uncompressed dimensions of the compliant material.

The compliant material may stay within the maximum uncompressed dimension when compressed by expanding into one or more gaps defined in the compliant material. Such gaps may be defined on an external surface of the compliant material and/or internal to the compliant material. The gaps may be formed using a variety of different processes during or after formation of the compliant material.

In various implementations, a force sensor may include sensor plates and compliant material positioned between the sensor plates. The compliant material may have a maximum dimension in a first direction when uncompressed, vary in shape between an uncompressed state and a compressed state, and be configured to stay within the maximum dimension when compressed in a second direction. The first direction may be perpendicular to the second direction.

In some implementations, a compressible assembly may include a force sensor comprising first and second conductive plates and a compressible material positioned between the conductive plates. The compressible material may have a maximum dimension when uncompressed, vary in shape between an uncompressed state and a compressed state, define at least one internal void space within the compressible material, define at least an edge of an internal void space into which the compressible material enters upon compression, and expand to no greater than the maximum dimension and into the internal void space when force is applied to a surface of the compressible material. A direction of expansion of the compressible material may be perpendicular to a plane defined by at least one of the first and second conductive plates.

In one or more implementations, a method for compensating for deformation in a force sensor may include: assembling the force sensor including sensor plates; including compliant material in the force sensor between the sensor plates, the compliant material varying in shape between a compressed state and an uncompressed state and having a maximum dimension in a direction when uncompressed; and configuring the compliant material to stay within the maximum dimension when compressed perpendicular to the direction.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

The description that follows includes sample systems, methods, and apparatuses that embody various elements of the present disclosure. However, it should be understood that the described disclosure may be practiced in a variety of forms in addition to those described herein.

The present disclosure details systems, apparatuses methods related to compliant materials that are designed to compensate for deformation. A force sensor includes compliant material (such as silicone, silicone foam, elastomer, and/or various other compliant materials) that may be configured to stay within a maximum uncompressed dimension in a first direction when compressed in a second direction. The first direction may be perpendicular to the second direction. In this way, the compliant material may be compressed without expanding beyond the uncompressed dimensions of the compliant material.

In various implementations, the compliant material may define one or more gaps. Such gaps may be formed on an internal and/or an external surface of the compliant material. The compliant material may expand into these gaps under compression such that the compressed dimensions do not exceed the uncompressed dimensions.

Figure 1:
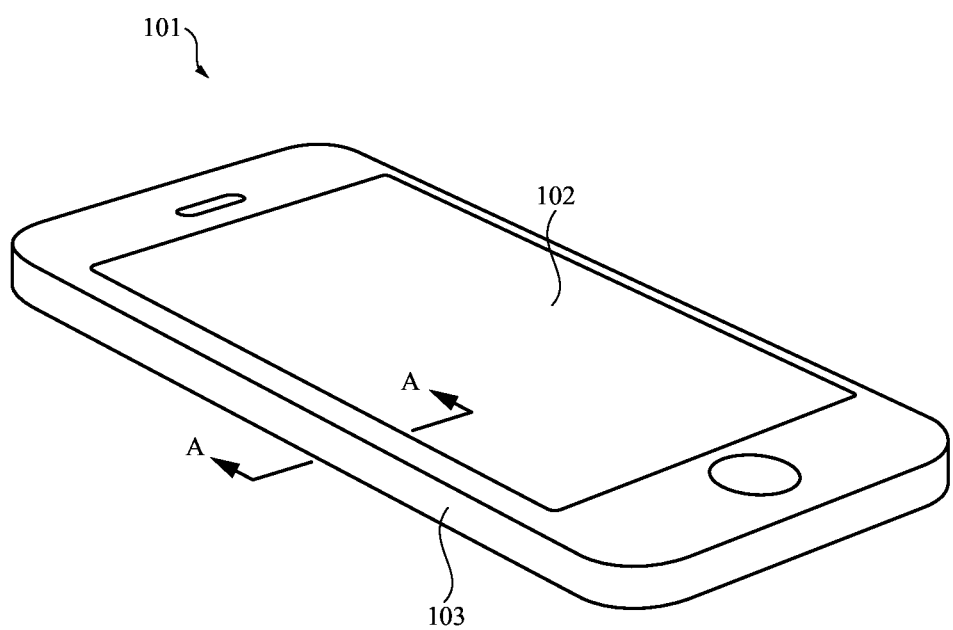
FIG. 1 is an isometric view of an example electronic device that may include a force sensor with compliant material that compensates for deformation.

FIG. 1 is an isometric view of an example electronic device 101 that may include a force sensor with compliant material that compensates for deformation. As illustrated, the electronic device may be a smart phone with a screen 102 and a housing 103. However, it is understood that this is an example. In various implementations, the electronic device may be any kind of electronic device such as a desktop computer, a laptop computer, a cellular telephone, a digital media player, a mobile computer, a tablet computer, a wearable device, and/or any other electronic device without departing from the scope of the present disclosure.

The electronic device may also include one or more additional components not shown. Such additional components may include, but are not limited to, one or more processing units, one or more communication components, one or more non-transitory storage media (which may take the form of, but is not limited to, a magnetic storage medium; optical storage medium; magneto-optical storage medium; read only memory; random access memory; erasable programmable memory; flash memory; and so on), and/or various other components.

Figure 2A:
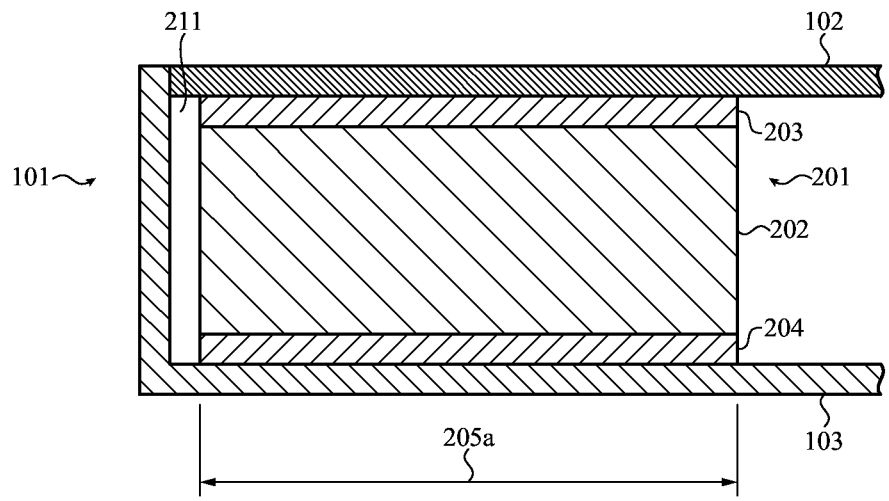
FIG. 2A is a cross sectional view of a first example force sensor that may be utilized in the electronic device of FIG. 1, taken along line A-A of FIG. 1.

FIG. 2A is a cross sectional view of a first example force sensor 201 that may be utilized in the electronic device 101 of FIG. 1, taken along line A-A of FIG. 1. The force sensor may be compressed by force exerted on the screen 102 (shown in FIG. 2B) and output from the force sensor related to the compression may be analyzed to determine the amount of force exerted.

For example, the force sensor 201 may be a capacitive force sensor including compliant or other compressible material 202 (such as silicone, silicone foam, elastomer, gel, and so on) separating conductive plates, electrodes, or electrode arrays, or other sensors 203 and 204. The term "plate," as used herein, is intended to encompass all such sensor configurations unless such breadth renders an embodiment technically inoperable. A capacitance between the conductive plates may change when the distance between the conductive plates changes. As force is exerted to compress the compliant material in order to change the distance between the conductive plates, changes in capacitance between the conductive plates may be analyzed to determine force exerted on the screen 102.

However, it is understood that this is an example and that various other force sensor 201 configurations are possible without departing from the scope of the present disclosure. By way of an example, in various implementations the force sensor may be a capacitive force sensor that utilizes capacitance differences between a single conductive plate and an object (such as a user's finger) that exerts force on the screen 102. Further, in some embodiments, the plates 203, 204 may be resistive sensors rather than conductive sensors, such that an electrical resistance varies in response to varying a distance between the plates. In still other embodiments, plates 203, 204 may be an optical sensor and/or emitter, such that an amount of light emitted by one plate and that is sensed by another plate varies in response to the distance between the plates varying. Thus, it should be appreciated that embodiments may be described herein with respect to capacitive sensing but may encompass other types of sensing, including those mentioned above.

Figure 2B:
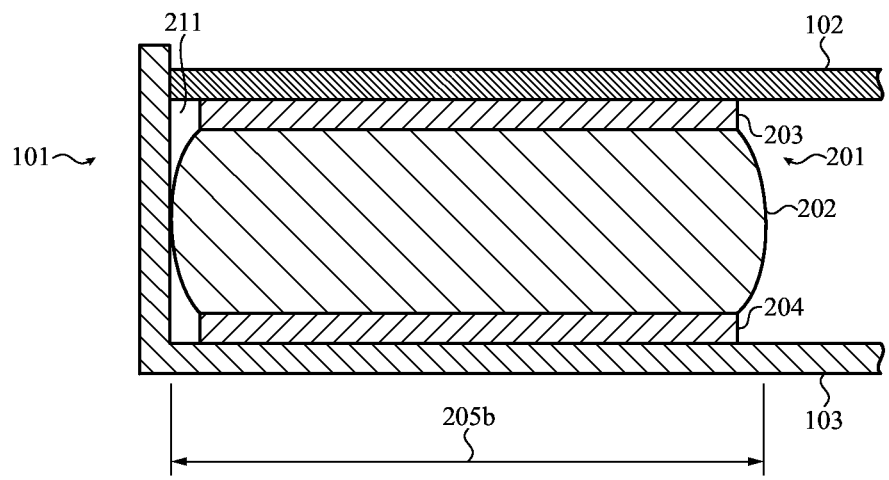
FIG. 2B shows the first example force sensor of FIG. 2A when compressed.

As shown, the force sensor 201 is separated from the housing 103 by a space 211. When the compliant material 202 is compressed as shown in FIG. 2B, the compliant material may bulge or expand (going from a maximum uncompressed horizontal dimension 205a when uncompressed in FIG. 2A to a greater maximum compressed dimension 205b when compressed) into that space and contact the housing. Contact between the compliant material and the housing may alter the amount of force utilized to continue compression of the compliant material. In other words, the compliant material may compress between an uncompressed position and a first compressed position under a first amount of force prior to contact between the compliant material and housing and then the first compressed position and a second compressed position under a second, greater amount of force subsequent to the contact. This may result in discontinuous force determination from output of the force sensor.

Figure 3A:
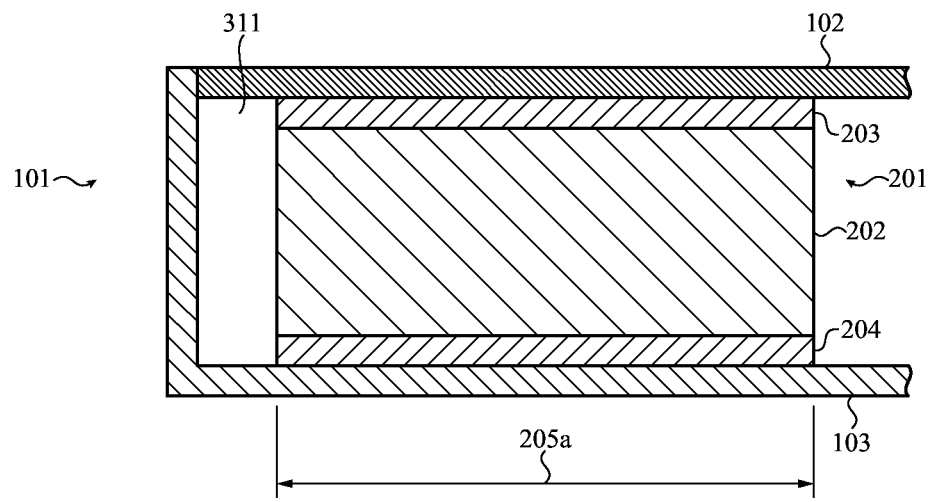
FIG. 3A is a cross sectional view of a second example force sensor that may be utilized in the electronic device of FIG. 1, taken along line A-A of FIG. 1.
Figure 3B:
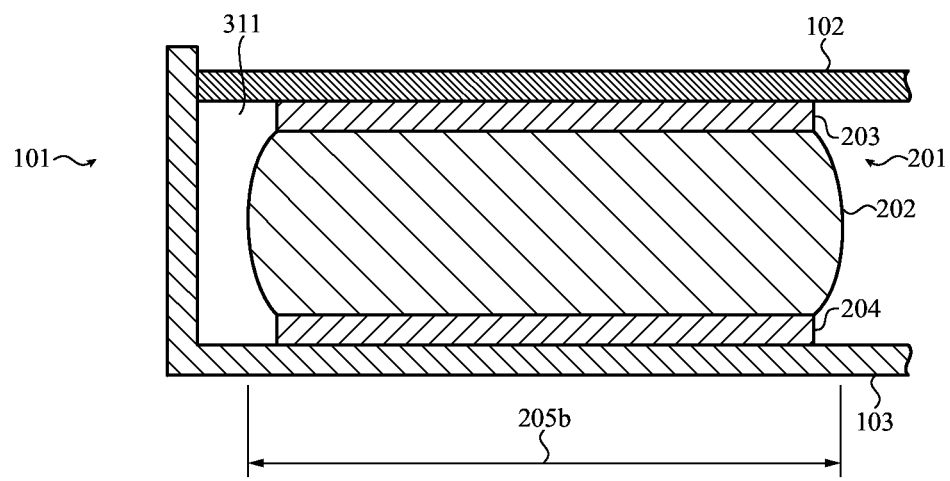
FIG. 3B shows the second example force sensor of FIG. 3A when compressed.

In order to ameliorate such discontinuous force determination, the space 211 may be configured to be great enough so that the compliant material 202 will not expand to contact the housing 103 under the exertion of force (and/or will not expand to contact the housing under the exertion of a maximum amount of force for which the force sensor is configured. FIGS. 3A-3B are cross sectional views of a second example force sensor that is so configured. As shown, the force sensor is separated from the housing by a space 311 of dimensions sufficient that the compliant material does not expand to contact the housing when compressed. As such, discontinuous force determination may not result from output of the force sensor.

Although FIGS. 3A-3B illustrate the space 311 being formed of sufficient dimensions by positioning the force sensor further from the housing than in FIGS. 2A-2B, it is understood that this is an example. In some implementations, a void may be formed in the housing to accommodate expansion of the compliant material 202 when compressed such that the compliant material does not contact the housing.

Regardless, the configuration illustrated in FIGS. 3A-3B may utilize more space inside the electronic device 101 than that of FIGS. 2A-2B. Further, although FIGS. 3A-3B are discussed above as spacing the force sensor 201 such that the force sensor does not expand to contact the housing, the force sensor may also be spaced from other components of the electronic device to prevent those other components from causing discontinuous force determination. This increased space utilization relating to the fact that the force sensor still expands beyond a maximum uncompressed dimension 205a when compressed may result in an increased minimum size of the electronic device, prevent inclusion of other components that could otherwise be positioned in that space, and so on. However, force sensors that do not contact the housing 103 (and/or other components) without utilizing such an increased space may be possible in implementations where the compliant material 202 is configured to stay (or expand) within the maximum uncompressed horizontal dimension when compressed vertically.

Figure 4A:
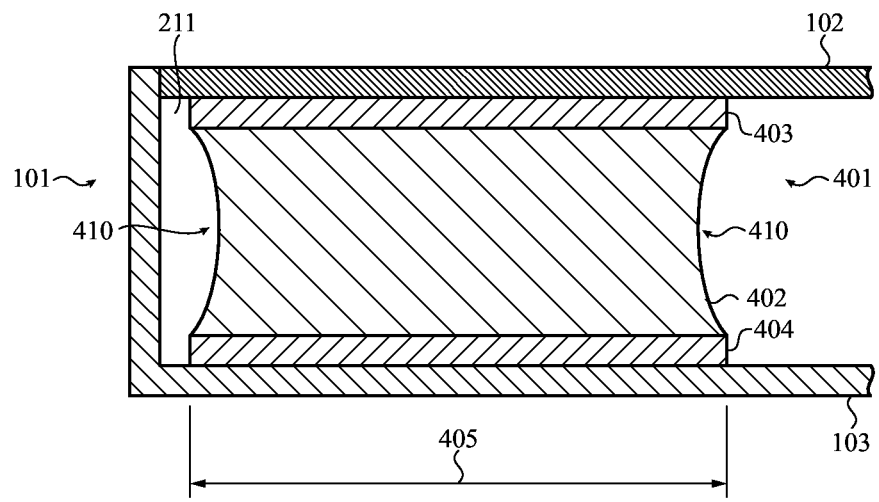
FIG. 4A is a cross sectional view of a third example force sensor that may be utilized in the electronic device of FIG. 1, taken along line A-A of FIG. 1.
Figure 4B:
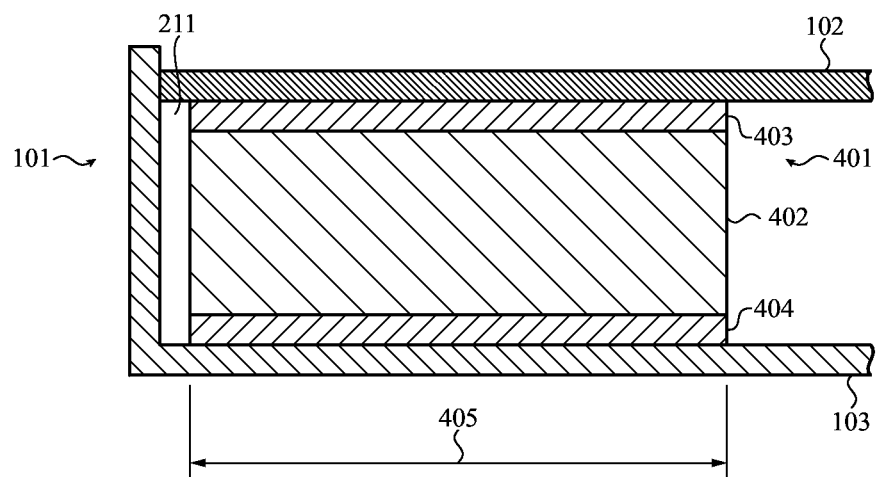
FIG. 4B shows the third example force sensor of FIG. 4A when compressed.

For example, FIG. 4A is a cross sectional view of a third example force sensor 401 that may be utilized in the electronic device 101 of FIG. 1, taken along line A-A of FIG. 1. As illustrated, the compliant material 402 of the force sensor defines a number of curved gaps (or spaces) 410 on the exterior sides of the compliant material when the compliant material is uncompressed. As illustrated in FIG. 4B, compression of the compliant material causes the compliant material to fill the gaps such that the sides are no longer curved, changing the horizontal dimensions of the compliant material at a position corresponding to the gap, but the horizontal dimension of the compressed compliant material is not greater than the maximum uncompressed horizontal dimension 405. Thus, as the force sensor does not have a greater maximum horizontal dimension when compressed vertically than when uncompressed, the force sensor may be positioned closer to the housing 103 and/or other components without resulting in contact during compression and therefore discontinuous force determination.

Although FIGS. 4A-4B are illustrated and described with reference to horizontal and vertical dimensions and surfaces, it is understood that these are for the sake of clarity. In various implementations, the compliant material 402 may be compressed in any first direction by the exertion of force on a surface and may stay within (or expand within) a maximum uncompressed dimension in any second direction perpendicular to the first direction.

The gaps 410 may be formed in various ways in various implementations. For example, the compliant material 402 may be formed with flat sides from which material may be carved, cut, chemical etching, and/or otherwise removed to form the gaps 410.

By way of illustration, the compliant material 402 may be formed as a sheet with flat sides. Portions of the sheet may be bathed in an etchant (such as an acid or other chemical corrosive to the material of the sheet) and/or the etchant may be otherwise applied to selected portions of the sheet. The etchant may dissolve and/or otherwise remove the portions of the sheet, forming the gaps 410. Although this illustration described using chemical etching to remove gaps on the sides of a sheet of material, it is understood that this is an example. In various implementations, such a chemical etching process may be used to dissolve and/or otherwise remove portions of material configured in various shapes to create holes or other voids in a surface of, within, and/or through material.

By way of another example, the compliant material 402 may be molded in a shape where the gaps 410 are present. By way of illustration, a material such as silicone may be formed in a mold that has a shape preventing the material from filing the area of the gaps during the molding.

In still other examples, the compliant material 402 may be formed of a number of layers of varying horizontal dimensions. Middle layers may be formed to have the smallest horizontal dimensions whereas layers at the top and bottom may be formed to have the largest horizontal dimensions. In this way, a stepped configuration of layers may be formed that resembles the generally curved sides of the compliant material at the gaps 410.

In yet other examples, the compliant material 402 may be formed with flat sides similar to the compliant material 202 in FIG. 2A. The compliant material 402 may then be compressed and the portion of the compliant material that expands beyond the maximum uncompressed horizontal dimension may be cut away and/or otherwise removed. By way of illustration, FIGS. 5A-5D illustrate such an example of assembly of the third example force sensor 401 of FIG. 4A.

Figure 5A:
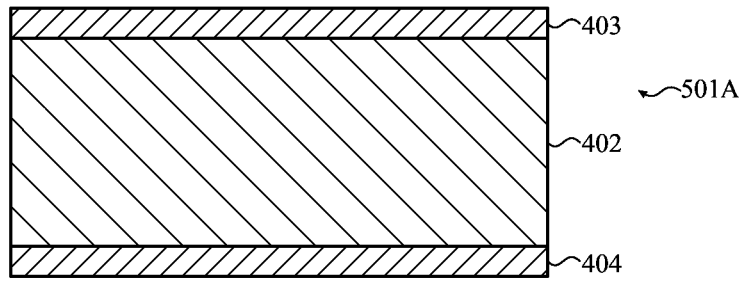
FIGS. 5A-5D illustrate an example of assembly of the third example force sensor of FIG. 4A.
Figure 5B:
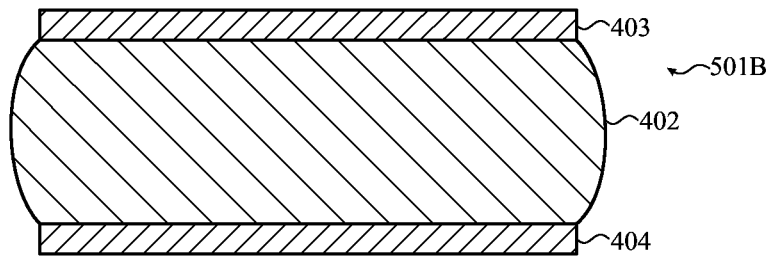
Figure 5C:
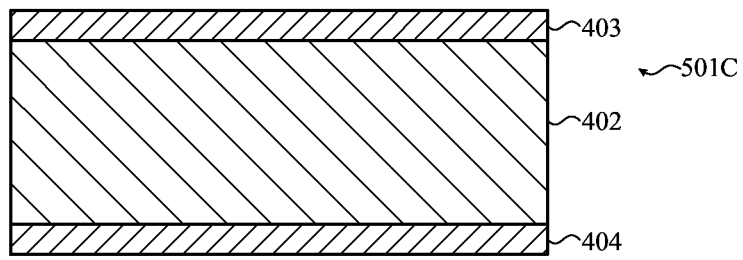
Figure 5D:
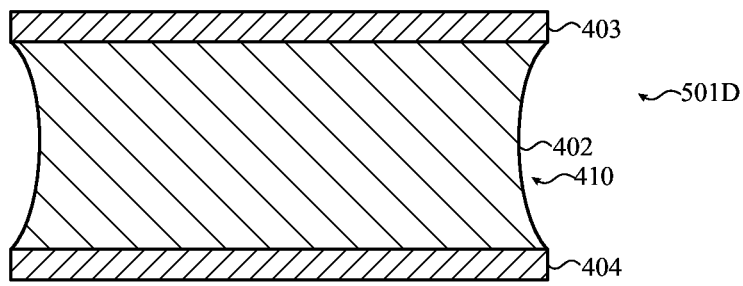

As illustrated in FIG. 5A, the compliant material 402 may be formed with flat sides similar to the compliant material 202 in FIG. 2A. In FIG. 5b, the compliant material 402 may be compressed such that a portion of the compliant material 402 expands beyond a maximum uncompressed horizontal dimension, similar to FIG. 2B. This portion of the material may then be removed, as shown in FIG. 5C. When the compliant material 402 is then allowed to go back to the uncompressed state as shown in FIG. 5D, the gaps 410 may be evident.

In yet more examples, the compliant material 402 may be perforated with one or more holes in the vertical, horizontal, or other dimension of the compliant material. Such holes may be the gaps into which the compliant material may bulge into upon compression in order to expand within the maximum uncompressed dimension.

In various implementations, various thermal properties of the compliant material 402 may be utilized when forming the gaps 410. For example, the compliant material may be a type of material that cuts more evenly when chilled. As such, the compliant material may be chilled before a portion of the compliant material is removed to form the gaps.

By way of another example, the compliant material 402 may expand when heated. As such, the compliant material may be heated such that a portion expands beyond the maximum horizontal dimension similar to how the compliant material is illustrated as expanding when compressed in FIG. 5B. This portion may then be removed, forming the gaps as illustrated in FIG. 5D without compression of the compliant material during formation of the gaps.

Although FIGS. 4A-4B and 5A-5D illustrate the gaps 410 as a curved surface of the compliant material 402. However, it is understood that this is an example. In various implementations, the portion of the compliant material defining the gaps may be otherwise shaped (such as wedge-shaped, squared, stepped, and so on) without departing from the scope of the present disclosure.

Moreover, FIGS. 4A-4B illustrate and describe the force sensor 401 as positioned a space 211 away from the housing 103. However, as the compliant material 402 does not exceed the maximum uncompressed vertical dimension 405 when compressed, the force sensor may be positioned even closer to the housing than the force sensor 201 of FIGS. 2A-2B (which may be unable to be compressed sufficiently without the space 211). Due to the fact that the compliant material 402 does not exceed the maximum uncompressed vertical dimension 405 when compressed, in some implementations the force sensor 401 may be able to be positioned directly adjacent to the housing and/or other components without adversely affecting compression of the compliant material and/or force determination from output of the force sensor 401.

Additionally, although FIGS. 4A-5D illustrate the gaps as being formed on an external surface of the compliant material 402, it is understood that this is an example. In various implementations, gaps into which the compliant material may expand or bulge upon compression may be formed internal to the compliant material.

Figure 6A:
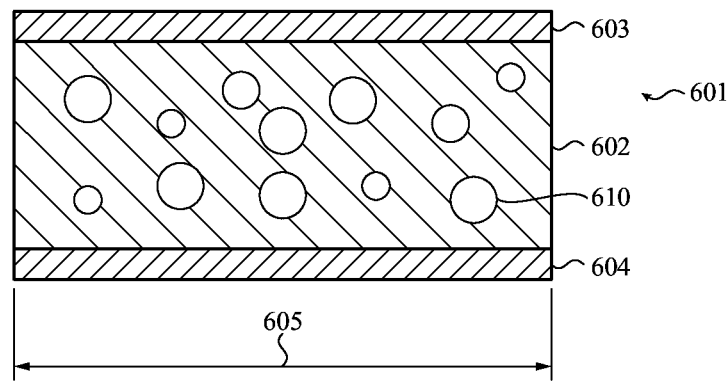
FIG. 6A illustrates a fourth example force sensor.
Figure 6B:
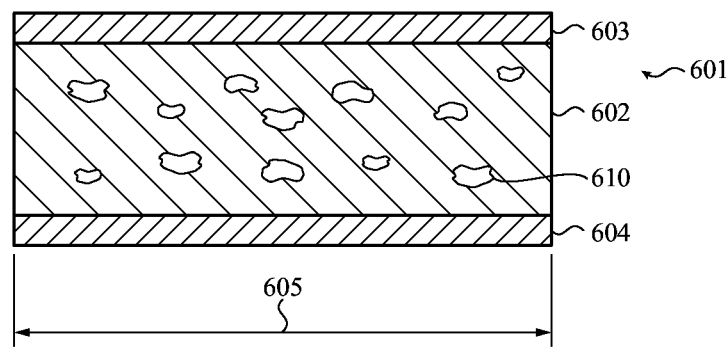
FIG. 6B shows the fourth example force sensor of FIG. 6A when compressed.

For example, FIG. 6A illustrates a fourth example force sensor 601. As illustrated, the compliant material 602 includes a number of gaps 610 internal to the compliant material. FIG. 6B shows the fourth example force sensor of FIG. 6A when compressed. As illustrated, the compliant material may expand or bulge inward into the internal gaps (horizontally and/or vertically) such that the sides of the compliant material do not change shape between compressed and uncompressed states (shown as flat in both FIGS. 6A and 6B).

As shown in FIGS. 6A and 6B, the compliant material 602 may be a foam (such as a silicone foam) where the internal gaps 610 are a number of bubbles inside the compliant material (which may be formed by heating the compliant material). However, it is understood that this is an example. In various implementations, the compliant material may be various different types of materials and the internal gaps or spaces may be variously configured (such as internal gaps that extend through a vertical or horizontal cross section of the compliant material, internal versions of the external gaps 410 of FIGS. 4A-4b, and so on) without departing from the scope of the present disclosure.

Figure 7:
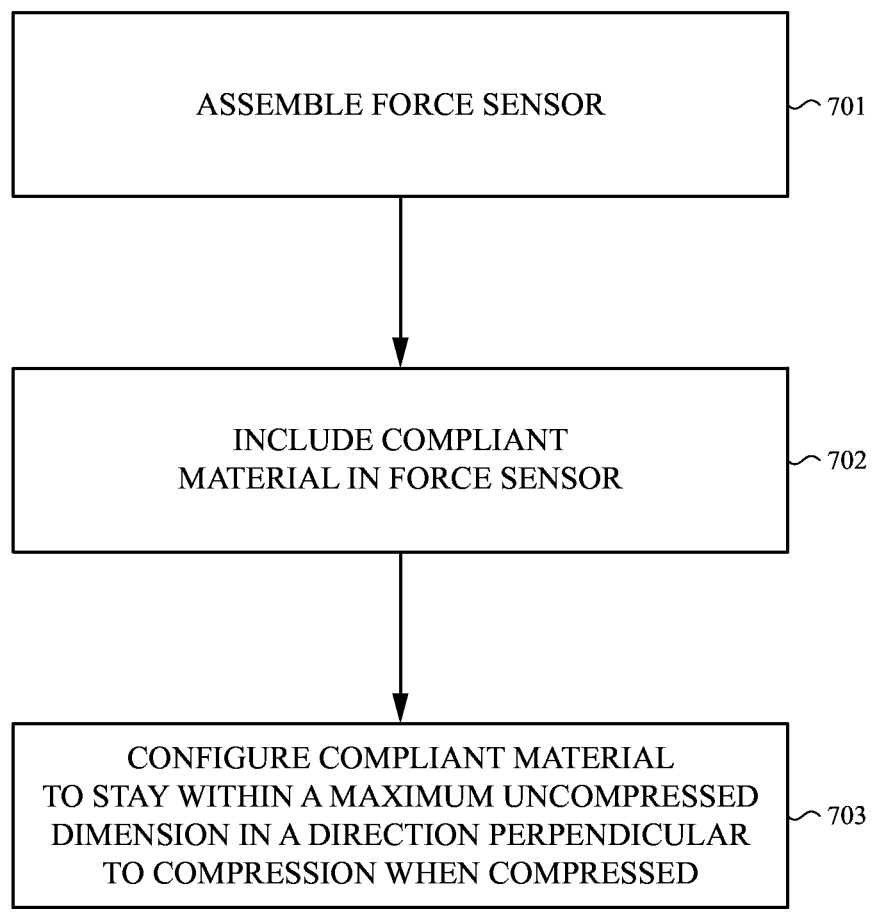
FIG. 7 is a flow chart illustrating an example method for compensating for deformation in a force sensor. This method may be utilized in forming the force sensors of FIGS. 4A-4B and/or 6A-6B.

FIG. 7 is a flow chart illustrating an example method 700 for compensating for deformation in a force sensor. This method may be utilized in forming the force sensors of FIGS. 4A-4B and/or 6A-6B.

The flow may begin at block 701 where a force sensor may be assembled. The flow may then proceed to block 702 where a compliant material may be included in the force sensor. Next, the flow may proceed to block 703 where the compliant material may be configured to stay within a maximum uncompressed dimension in a direction perpendicular to compression when compressed.

Although the example method 700 is illustrated and described as including particular operations performed in a particular order, it is understood that this is an example. In various implementations, various orders of the same, similar, and/or different operations may be performed without departing from the scope of the present disclosure.

For example, blocks 701 and 702 are illustrated and described as separate, linearly performed operations. However, in various implementations the operation of including the compliant material in the force sensor may be part of assembling the force sensor without departing from the scope of the present disclosure.

By way of another example, blocks 702 and 703 are illustrated and described as separate, linearly performed operations. However, in various implementations the operation of configuring the compliant material may be performed prior to and/or simultaneously with the operation of including the compliant material in the force sensor without departing from the scope of the present disclosure.

Further, although the compliant material illustrated and discussed herein is described in the context of a force sensor, it is understood that this is an example. In various implementations, compliant materials configured to deform in such a way may be utilized outside of the context of force sensors (such as in other sensors, seals, gaskets, and so on) without departing from the scope of the present disclosure.

As described above and illustrated in the accompanying figures, the present disclosure details systems, apparatuses methods related to compliant materials that are designed to compensate for deformation. A force sensor includes compliant material (such as silicone, silicone foam, elastomer, and/or various other compliant materials) that may be configured to stay within a maximum uncompressed dimension in a first direction when compressed in a second direction. The first direction may be perpendicular to the second direction. In this way, the compliant material may be compressed without expanding beyond the uncompressed dimensions of the compliant material.

In the present disclosure, the methods disclosed may utilize sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be utilize a computer program product, or software, that may include a non-transitory machine-readable medium having stored thereon instructions, which may be used to program a computer system (such as a computer controlled manufacturing system or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A force sensor, comprising:
sensor plates;
a compliant material positioned between the sensor plates that:
  defines a first end, a middle, and a second end, such that:
    the first end is adjacent one sensor plate;
    the second end is adjacent another sensor plate; and
    the middle is between the first end and the second end;
  defines an external surface extending between the first and the second ends and defining a recessed gap in the compliant material when in an uncompressed state;
  has a maximum dimension in a first direction when in the uncompressed state;

varies in shape between the uncompressed state and a compressed state; and is configured to stay within the maximum dimension when compressed in a second direction; wherein the first direction is perpendicular to the second direction; and while the compliant material is in the uncompressed state, a maximum dimension of the middle is smaller than a dimension of the first end and a dimension of the second end, measured along the first direction.

2. The force sensor of claim 1, wherein the compliant material:

expands into the gap when compressed; or eliminates the gap.

3. The force sensor of claim 1, wherein a void is defined: internal to the compliant material.

4. The force sensor of claim 1, wherein a portion of the external surface defining the gap is inwardly curved when the compliant material is in the uncompressed state.

5. The force sensor of claim 1, wherein the compliant material comprises multiple layers, each with a maximum dimension perpendicular to the second direction, arranged in a stepped configuration to define the gap.

6. The force sensor of claim 1, wherein two opposing portions of the external surface defining the gap are inwardly curved when the compliant material is in the uncompressed state.

7. The force sensor of claim 1, wherein the maximum dimension in the first direction in the uncompressed state is located at the first end, the second end, or both.

8. A compressible assembly, comprising:

a force sensor comprising first and second conductive plates;

a compressible material positioned between the conductive plates that:

has a first end adjacent the first conductive plate;

has a second end adjacent the second conductive plate;

has a first side extending from the first end to the second end;

has a second side extending from the first end to the second end;

has a default dimension defined between the sides when the compressible material is uncompressed;

varies in shape between an uncompressed state and a compressed state;

defines at least an edge of at least one perforation extending from the first side to the second side of the compressible material, the at least one perforation defining a void space into which the compressible material enters upon compression; and expands, from the default dimension, to no greater than a maximum dimension and into the void space when a compressive force is applied to the ends of the compressible material;

wherein a direction of expansion of the compressible material is perpendicular to a plane defined by at least one of the first and second conductive plates.

9. The compressible assembly of claim 8, wherein the force sensor comprises a capacitive force sensor.

10. The compressible assembly of claim 8, wherein the force sensor comprises a resistive force sensor.

11. The compressible assembly of claim 8, wherein the compressible material comprises silicone.

12. The compressible assembly of claim 8, wherein the compressible material comprises foam.

13. The compressible assembly of claim 8, wherein the sides of the compressible material perpendicular to the plane are flat.

14. A method for compensating for deformation in a force sensor, comprising:

assembling the force sensor including sensor plates;

including a compliant material in the force sensor between the sensor plates, the compliant material varying in shape between a compressed state and an uncompressed state, having a maximum dimension in a first direction when in the uncompressed state, defining a first end, a middle and a second end, the first end adjacent one sensor plate, the second end adjacent another sensor plate, and the middle being between the first end and the second end, and defining an external surface extending between the first and the second ends; and configuring the compliant material to stay within the maximum dimension when compressed in a second direction perpendicular to the first direction by defining a recessed gap in the compliant material, the gap defined by the external surface of the compliant material; wherein while the compliant material is in the uncompressed state, a maximum dimension of the middle is smaller than a dimension of the first end and a dimension of the second end, measured along the first direction.

15. The method of claim 14, wherein said defining the gap comprises:

compressing the compliant material in the second direction such that a portion of the compliant material expands beyond the maximum dimension; and removing the portion of the compliant material such that the gap is defined when the compliant material is uncompressed.

16. The method of claim 14, wherein said defining the gap comprises forming the compliant material to include the gap.

17. The method of claim 14, wherein said defining the gap comprises:

forming the compliant material; and removing a portion of the compliant material to define the gap.

18. The method of claim 14, further comprising incorporating the force sensor into an electronic device wherein the sensor plates contact a housing of the electronic device in the direction perpendicular to compression of the compliant material.

19. The method of claim 14, wherein a portion of the external surface defining the gap is inwardly curved when the compliant material is in the uncompressed state.

20. The method of claim 14, wherein two opposing portions of the external surface defining the gap are inwardly curved when the compliant material is in the uncompressed state.

* * * * *